(12) United States Patent
Savran et al.

(10) Patent No.: US 9,816,852 B2
(45) Date of Patent: Nov. 14, 2017

(54) SYSTEM FOR WEIGHING INDIVIDUAL MICRO- AND NANO-SIZED PARTICLES

(71) Applicant: Purdue Research Foundation, West Lafayette, IN (US)

(72) Inventors: Cagri Abdullah Savran, West Lafayette, IN (US); Bin-Da Chan, West Lafayette, IN (US); Kutay Icoz, Kayseri (TR)

(73) Assignee: Purdue Research Foundation, West Lafayette, IN (US)

( * ) Notice: Subject to any disclaimer, the term of this patent is extended or adjusted under 35 U.S.C. 154(b) by 152 days.

(21) Appl. No.: 14/525,155

(22) Filed: Oct. 27, 2014

(65) Prior Publication Data

US 2015/0068309 A1    Mar. 12, 2015

Related U.S. Application Data

(60) Provisional application No. 61/895,734, filed on Oct. 25, 2013.

(51) Int. Cl.
*G01G 3/16*    (2006.01)

(52) U.S. Cl.
CPC ............. *G01G 3/165* (2013.01); *G01G 3/16* (2013.01)

(58) Field of Classification Search
CPC .................................. G01G 3/16; G01G 3/165
USPC ..................................................... 73/580, 651
See application file for complete search history.

(56) References Cited

U.S. PATENT DOCUMENTS

| | | | | |
|---|---|---|---|---|
| 5,908,981 A | * | 6/1999 | Atalar | B82Y 35/00 356/501 |
| 2005/0028593 A1 | * | 2/2005 | Rodier | G01G 3/13 73/580 |
| 2006/0219010 A1 | * | 10/2006 | Ilic | G01N 29/022 73/590 |

OTHER PUBLICATIONS

G.G. Yaralioglu, A. Atalar, S. R. Manalis, C.F. Quate, Analysis and design of an interdigital cantilever as a displacement sensor, Published Mar. 19, 1998 in vol. 83, No. 12 of Journal of Applied Physics.*

J. Z. Hilt, A. K. Gupta, R. Bashir, and N. A. Peppas, "Ultrasensitive biomems sensors based on microcantilevers patterned with environmentally responsive hydrogels," Biomed. Microdevices, 2003, vol. 5, pp. 177-184.

K. M. Hansen, H. F. Ji, G. H. Wu, R. Datar, R. Cote, et al., "Cantilever-based optical deflection assay for discrimination of DNA single-nucleotide mismatches," Anal. Chem., 2001, vol. 73, pp. 1567-1571.

R. Flores-Perez, A. K. Gupta, R. Bashir, and A. Ivanisevic, "Cantilever based sensor for the detection of different chromophore isomers," Anal. Chem., 2007, vol. 79, pp. 4702-4708.

(Continued)

*Primary Examiner* — R. A. Smith
*Assistant Examiner* — John M Royston
(74) *Attorney, Agent, or Firm* — Piroozi-IP, LLC (57) ABSTRACT

A device for weighing micro- and nano-sized particles. The device includes a base portion, an oscillator coupled to the base portion and configured to vibrate the base portion, a first cantilevered beam coupled to the base portion, a second cantilevered beam coupled to the base portion, a first plurality of fingers coupled to the first cantilevered beam near the tip inwardly pointing toward the second cantilevered beam, and a second plurality of fingers coupled to the second cantilevered beam near the tip inwardly pointing toward the first cantilevered beam.

19 Claims, 11 Drawing Sheets

(56) References Cited

OTHER PUBLICATIONS

N. V. Lavrik, M. J. Sepaniak, and P. G. Datskos, "Cantilever transducers as a platform for chemical and biological sensors," Rev. Sci. Instrum., 2004, vol. 75, pp. 2229-2253.

F. M. Battiston, et al., "A chemical sensor based on a microfabricated cantilever array with simultaneous resonance-frequency and bending readout," Sens. Actuators B, Chem., 2001, vol. 77, pp. 122-131.

R. Raiteri, M. Grattarola, H. J. Butt, and P. Skladal, "Micromechanical cantilever-based biosensors," Sens. Actuators B, Chem., 2001, vol. 79, pp. 115-126.

K. Park, J. Jang, D. Irimia, J. Sturgis, J. Lee, J. P. Robinson, M. Toner, and R. Bashir, "'Living cantilever arrays' for characterization of mass of single live cells in fluids," Lab Chip, 2008, vol. 8, No. 7, pp. 1034-1041.

S. Xu and R. Mutharasan, "Rapid and sensitive detection of giardia lamblia using a piezoelectric cantilever biosensor in finished and source waters," Environ. Sci. Technol., 2010, vol. 44, pp. 1736-1741.

K. H. Sandhage, M. B. Dickerson, P. M. Huseman, et al., "Novel, bioclastic route to self-assembled, 3D, chemically tailored meso/nanostructures: Shape-preserving reactive conversion of biosilica (diatom) microshells," Adv. Mater., 2002, vol. 14, pp. 429-433.

A. Gupta, D. Akin, and R. Bashir, "Single virus particle mass detection using microresonators with nanoscale thickness," Appl. Phys. Lett., 2004, vol. 84, pp. 1976-1978.

T. P. Burg, M. Godin, S. M. Knudsen, W. Shen, G. Carlson, J. S. Foster, K. Babcock, and S. R. Manalis, "Weighing of biomolecules, single cells and single nanoparticles in fluid," Nature, 2007, vol. 446, pp. 1066-1069.

B. D. Chan, F. Mateen, C. L. Chang, K. Icoz, and C. A. Savran, "A compact manually actuated micromanipulator," J. Microelectromech. Syst., 2012, vol. 21, pp. 7-9.

C. A. Savran, A. W. Sparks, J. Sihler, J. Li, W. C. Wu, et al., "Fabrication and characterization of a micromechanical sensor for differential detection of nanoscale motions," J. Microelectromech. Syst., 2002, vol. 11, pp. 703-708.

K. Icoz and C. Savran, "Nanomechanical biosensing with immunomagnetic separation," Appl. Phys. Lett., 2010, vol. 97, pp. 123701-1-123701-3.

C. A. Savran, T. P. Burg, J. Fritz, and S. R. Manalis, "Microfabricated mechanical biosensor with inherently differential readout," Appl. Phys. Lett., 2003, vol. 83, pp. 1659-1661.

C. A. Savran, S. M. Knudsen, A. D. Ellington, and S. R. Manalis, "Micromechanical detection of proteins using aptamer-based receptor molecules," Anal. Chem., 2004, vol. 76, pp. 3194-3198.

K. Icoz, B. D. Iverson, and C. Savran, "Noise analysis and sensitivity enhancement in immunomagnetic nanomechanical biosensors," Appl. Phys. Lett., 2008, vol. 93, p. 103902.

L. Johnson, A. T. K. Gupta, A. Ghafoor, D. Akin, and R. Bashir, "Characterization of vaccinia virus particles using microscale silicon cantilever resonators and atomic force microscopy," Sens. Actuators B, Chem., 2006, vol. 115, pp. 189-197.

D. S.Golovko, T. Haschke, W. Wiechert, and E. Bonaccurso, "Nondestructive and noncontact method for determining the spring constant of rectangular cantilevers," Rev. Sci. Instrum., 2007, vol. 78, pp. 043705-1-043705-6.

A. R. Parker, H. E. Townley, "Biomimetics of photonic nanostructures," Nature Nanotechnol., 2007, vol. 2, pp. 347-353.

J. Parkinson, R. Gordon, "Beyond micromachining: The potential of diatoms," Trends Biotechnol., 1999, vol. 17, pp. 190-196.

C. J. Liu and E. Bonaccurso, "Microcantilever sensors for monitoring the evaporation of microdrops of pure liquids and mixtures," Rev. Sci. Instrum., 2010, vol. 81, pp. 013702-1-013702-8.

N. Lobontiu, I. Lupea, R. Ilic, and H. G. Craighead, "Modeling, design, and characterization of multisegment cantilevers for resonant mass detection," J. Appl. Phys., 2008, vol. 103, pp. 064306-1-064306-10.

J. Bradbury, "Nature's nanotechnologists: Unveiling the secrets of diatoms," PLOS Biol., 2004, vol. 2, pp. 1512-1515.

Y. Liu, G. Zhao, L. Wen, X. Z. Xu, and J. R. Chu, "Mass-loading effect on quality factor of floppy silicon microcantilever in free air space," Micro Nano Lett., 2011, vol. 6, pp. 62-65.

N. Barker, R. A. Ridgway, et al., "Crypt stem cells as the cells-of-origin of intestinal cancer," Nature, 2009, vol. 457, pp. 608-611.

R. U. Lukacs, A. S. Goldstein, D. A. Lawson, D. H. Cheng, and O. N. Witte, "Isolation, cultivation and characterization of adult murine prostate stem cells," Nature Protocols, 2010, vol. 5, pp. 702-713.

M. F. Clarke, J. E. Dick, P. B. Dirks, et al., "Cancer stem cells—perspectives on current status and future directions: AACR Workshop on cancer stem cells," Cancer Res., 2006, vol. 66, pp. 9339-9344.

S. Ghosal, T. J. Leighton, et al., "Spatially Resolved Characterization of Water and Ion Incorporation in Bacillus Spores," Appl. Environ. Microbiol., 2010, vol. 76, pp. 3275-3282.

V. G. R. Chada, E. A. Sanstad, R. Wang, and A. Driks, "Morphogenesis of Bacillus spore surfaces," J. Bacteriol., 2003, vol. 185, pp. 6255-6261.

M. A. Kramer, R. L. Gieseck, B. Andrews, and A. Ivanisevic, "Sporeterminated cantilevers for chemical patterning on complex architectures," J. Amer. Chem. Soc., 2011, vol. 133, pp. 9627-9629.

A. Bozarth, U. G. Maier, S. Zauner, "Diatoms in biotechnology: Modern tools and applications," Appl. Microbiol. Biotechnol., 2009, vol. 82, pp. 195-201.

R. Gordon, D. Losic, M. A. Tiffany, S. S. Nagy, F. A. S. Sterrenburg, "The glass menagerie: Diatoms for novel applications in nanotechnology," Trends Biotechnol., 2009, vol. 27, pp. 116-127.

\* cited by examiner

SYSTEM FOR WEIGHING INDIVIDUAL MICRO- AND NANO-SIZED PARTICLES

CROSS-REFERENCE TO RELATED APPLICATIONS

The present U.S. patent application is related to and claims the priority benefit of U.S. Provisional Patent Application Ser. No. 61/895,734, filed Oct. 25, 2013, the contents of which are hereby incorporated by reference in their entirety into the present disclosure.

GOVERNMENT SUPPORT CLAUSE

This invention was made with government support under Grant No. 0925417 awarded by the National Science Foundation. The government has certain rights in the invention.

TECHNICAL FIELD

The present application relates to weighting systems and particularly to a micro- and nano-scale weighting system.

BACKGROUND

This section introduces aspects that may help facilitate a better understanding of the disclosure. Accordingly, these statements are to be read in this light and are not to be understood as admissions about what is or is not prior art.

The need to weigh micro-sized particles has become prevalent. Several approaches have been used to accomplish such weighing. One approach is based on cantilever-based micro/nano-sensors which have been used extensively over the past decade to detect a wide variety of entities including bio-molecules, chemicals, viruses and cells. These sensors have been used both in static (i.e. stress sensing) and dynamic (i.e. resonating) modes. The latter mode reveals the mass of the target entity by measuring changes in the resonance frequency of the cantilever.

Current strategies of weight measurement using cantilevers mostly depend upon probabilistic attachment of the targets on the cantilever surface. For example, resonators have been used to weigh single bacteria and viruses that bind to sensor surfaces both specifically and nonspecifically. The embodiments provided in the prior art have used suspended micro-channel resonators to measure bio-molecules and single nano-particles by flowing the target entities through the inner micro-channel of a cantilever.

The nature of the cantilever-based systems of the prior art, however, render them susceptible to error. Furthermore, the probabilistic nature of target attachment reduces the repeatability of measurements of a micro-particle specimen array. In addition, when one relies on probabilistic attachment of target entities, this approach makes it challenging to weigh an individual particle specifically selected by the user from a pool of other particles whose weights are not desired.

There is, therefore an unmet need for a novel approach to weigh individual micro/nano-sized particles of varying sizes while reducing errors associated with methodologies used in the prior art.

SUMMARY

A device for weighing micro- and nano-sized particles is disclosed. The device includes a base portion and an oscillator which is coupled to the base portion and is configured to vibrate the base portion. The device also includes a first cantilevered beam which is coupled to the base portion at a proximal end and having a tip portion at a distal end, and a second cantilevered beam coupled to the base portion at a proximal end and having a tip portion at a distal end. The device further includes a first plurality of fingers coupled to the first cantilevered beam near the tip inwardly pointing toward the second cantilevered beam, and a second plurality of fingers coupled to the second cantilevered beam near the tip inwardly pointing toward the first cantilevered beam. The first plurality of fingers interdigitating with the second plurality of fingers such that the first cantilevered beam and the second cantilevered beam can oscillate independent of each other. The interdigitating fingers are separated by gaps that are sufficiently small for light reflected from the interdigitating fingers during oscillation of the first and second cantilevered beams to form a diffraction pattern.

A system for weighting micro- and nano-sized particles is also disclosed. The system includes a resonator. The resonator includes a base portion and an oscillator which is coupled to the base portion and is configured to vibrate the base portion. The resonator also includes a first cantilevered beam which is coupled to the base portion at a proximal end and having a tip portion at a distal end, and a second cantilevered beam coupled to the base portion at a proximal end and having a tip portion at a distal end. The resonator further includes a first plurality of fingers coupled to the first cantilevered beam near the tip inwardly pointing toward the second cantilevered beam, and a second plurality of fingers coupled to the second cantilevered beam near the tip inwardly pointing toward the first cantilevered beam. The first plurality of fingers interdigitating with the second plurality of fingers such that the first cantilevered beam and the second cantilevered beam can oscillate independent of each other. The interdigitating fingers are separated by gaps that are sufficiently small for light reflected from the interdigitating fingers during oscillation of the first and second cantilevered beams to form a diffraction pattern. The system also includes a light source positioned proximate to the resonator and is configured to shine light on the interdigitating fingers. The system also includes at least one optical detector that is positioned proximate to the resonator to measure light intensity of at least one of the modes of the diffraction pattern.

A method for measuring mass of a micro- and nano-sized particles is disclosed. The method includes placing the micro- or nano-sized particle on a resonator. The resonator includes a base portion and an oscillator which is coupled to the base portion and is configured to vibrate the base portion. The resonator also includes a first cantilevered beam which is coupled to the base portion at a proximal end and having a tip portion at a distal end, and a second cantilevered beam coupled to the base portion at a proximal end and having a tip portion at a distal end. The resonator further includes a first plurality of fingers coupled to the first cantilevered beam near the tip inwardly pointing toward the second cantilevered beam, and a second plurality of fingers coupled to the second cantilevered beam near the tip inwardly pointing toward the first cantilevered beam. The first plurality of fingers interdigitating with the second plurality of fingers such that the first cantilevered beam and the second cantilevered beam can oscillate independent of each other. The interdigitating fingers are separated by gaps that are sufficiently small for light reflected from the interdigitating fingers during oscillation of the first and second cantilevered beams to form a diffraction pattern. The method also includes energizing the oscillator at a selective frequency thereby causing mechanical vibration in the first and second cantilevered arms. The method further includes directing a light beam from a light source onto the interdigitating fingers. In addition, the method includes sensing intensity of light of the reflected diffraction pattern by at least one photodetector positioned about at least one of the modes and varying the frequency by sweeping a range of frequencies. The method also includes correlating the sensed intensity to mass to thereby determine the mass of the micro- or nano-sized particle.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure describes a system that allows weighing a wide variety of individual micro- and nano-particles by placing them onto a resonator. A single target entity that is selected under a microscope is grabbed by a micro-manipulator and the entity is placed on the tip of a sensor beam of the cantilever for weighing. The particle weight is determined using optical diffraction modes, which permits highly accurate weight measurements as well as measurement of relative weight differences between particles.

Figure 1:
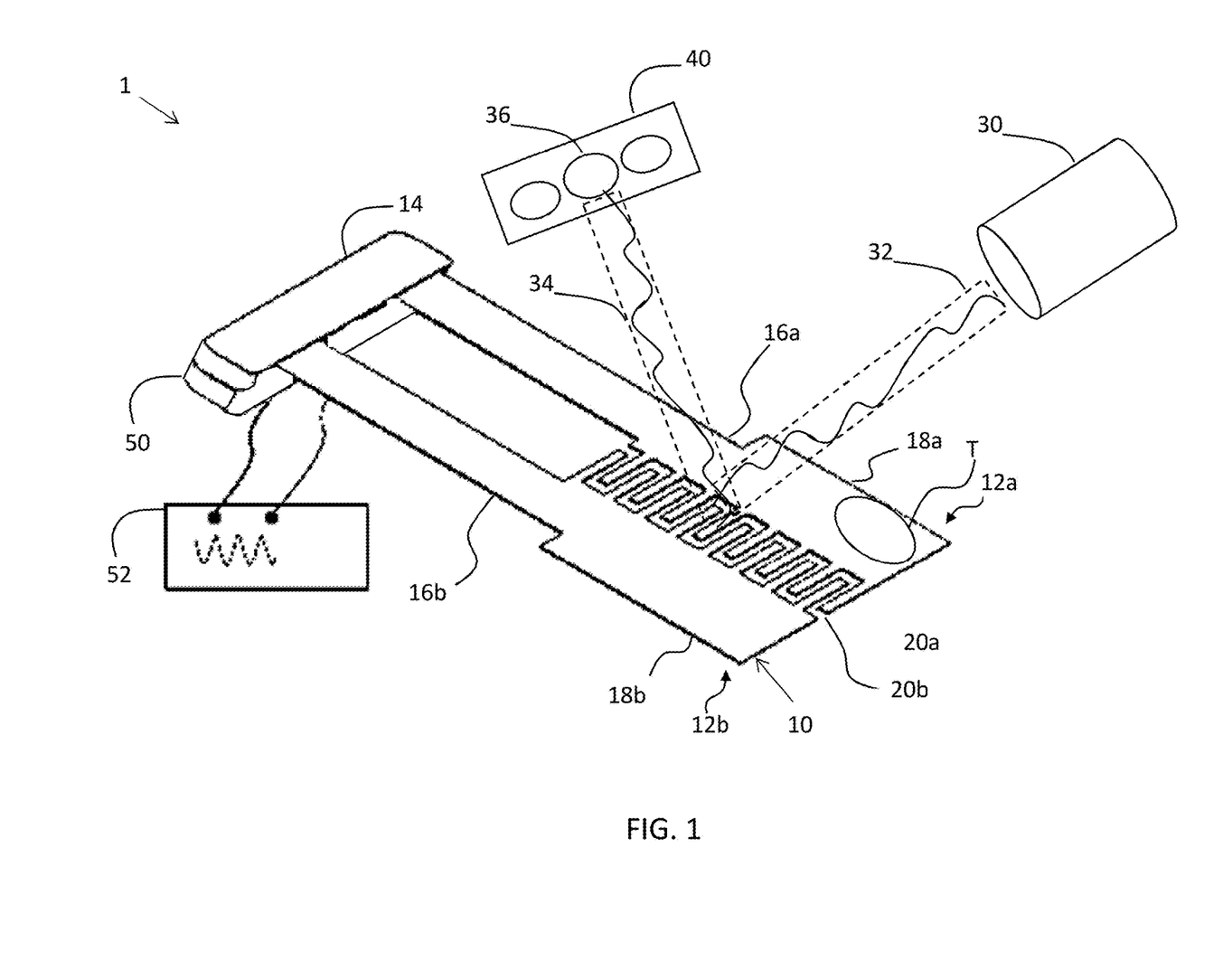
FIG. 1 is a perspective view of a system for weighing micro- and nano-sized particles incorporating a resonator as described herein.
Figures 2, 2A:
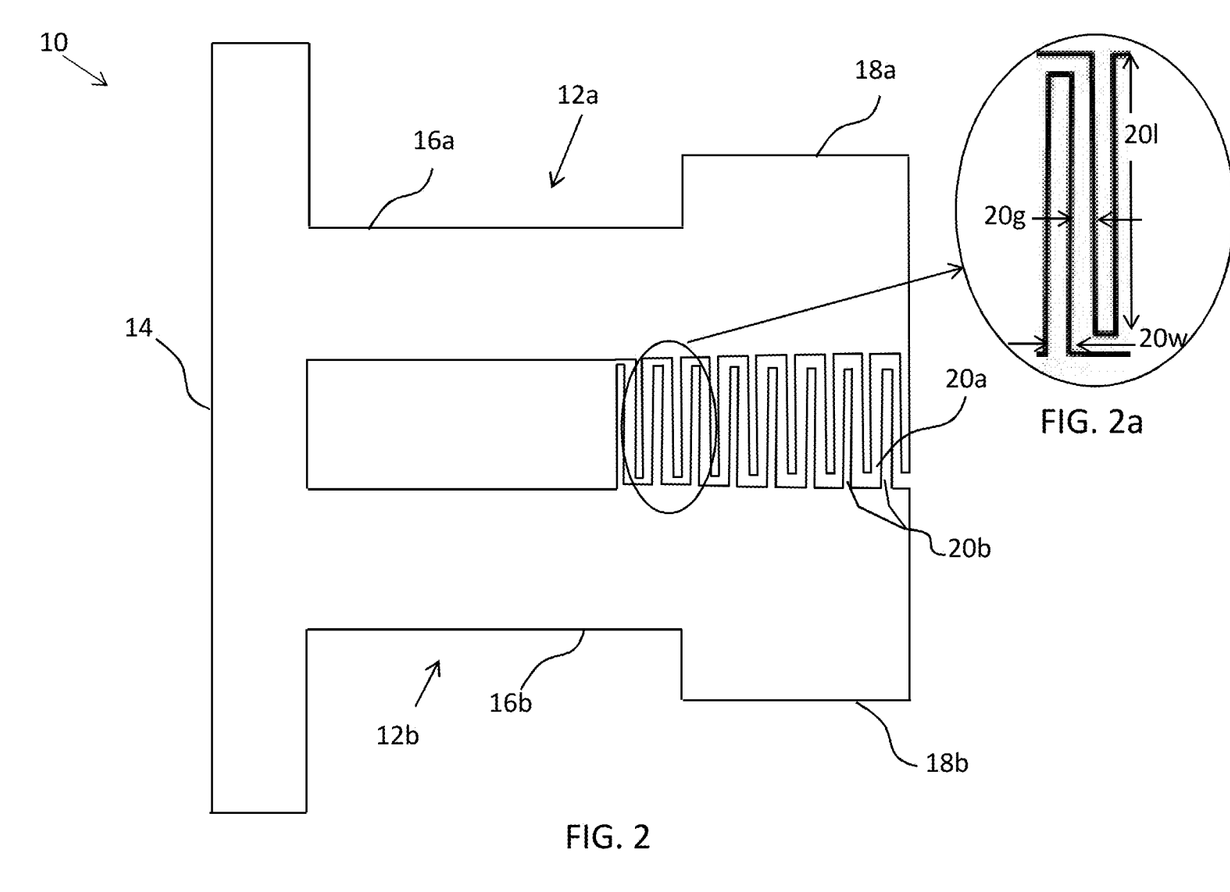
FIG. 2 is a top view of the resonator of FIG. 1 depicting a plurality of interdigitating fingers.
FIG. 2a is an enlarged view of two adjacent interdigitated fingers of FIG. 2.

In one feature, the system 1 includes a resonator 10, as illustrated in FIGS. 1-2, a light source 30, an optical detector array 40, and a function generator 52. The light source 30 is configured to shine light 32 to the resonator 10. Reflected light 34 reflects from the resonator and strikes the optical detector array 40 according to a diffraction pattern. The diffraction pattern includes spots or "modes", including $0^{th}$ mode. The optical detector array 40 includes at least one optical detector 36 positioned to sense the intensity of one of the modes, e.g., the $0^{th}$ mode.

The resonator 10 includes at least two adjacent beams 12a, 12b cantilevered from a base 14. The base 14 is attached to a piezoelectric shaker 50, but can be any electromechanically activated vibration mechanism. In one use of the resonator 10, one of the beams 12b serves as an inherent reference operable to suppress noise and other disturbances that affect both cantilevers similarly. The other beam 12a serves as the beam for the target particle. The beams 12a, 12b are preferably identically sized and shaped so that no or only minimal adjustments or calibrations are required to ensure accurate results. The beams may be formed in various geometries, but the rectangular geometry depicted in FIGS. 1-2 may be more suitable for fabrication purposes. Each beam includes a cantilevered arm 16 with the free end defining an enlarged support surface 18 for supporting a target particle. The support surface is enlarged to provide ample area for placement of the target particle by a micro-manipulator.

Each beam 12a and 12b includes two segments: arms 16a and 16b; and support surfaces 18a and 18b (also referred to as tip portions), respectively. In one important feature, each cantilevered beam includes a plurality of laterally-directed fingers 20a, 20b. As seen in the figures, the fingers are interdigitated so that light illuminating the beams produces a diffraction pattern, as described herein. The resonator may be fabricated using known micro-fabrication techniques, such as photolithography, etching or other known techniques. In the embodiment shown in the figures, the cantilevered beams each have a length of 50 μm to 500 μm or more narrowly between 200 μm to 300 μm; a width at the arms 16a and 16b of between about 10 μm to 100 μm and a width at the support surface 18 of between about 10 μm to 100 μm, or more narrowly between 35 μm to 85 μm, not including the interdigitated fingers. The fingers 20a, 20b, depicted in FIG. 2a, each have a width 20w of 2 to 5 μm and a length 20l of about 10 μm to 100 μm or more narrowly 40 μm to 60 μm and can range between 4 to 15 in number for each set of fingers with a gap 20g of 1 μm to 5 μm. The beams 12a and 12b each have a thickness of about 10 nm to 2 μm, or more narrowly between 500 nm to 1 μm.

The resonator may be formed as a silicon-rich silicon nitride layer. The fingers 20a and 20b may be coated with a thin layer of gold to improve reflectivity.

The system 1 includes the light source 30, e.g., a laser (NEWPORT R-30091, 5 mW, for example), that is oriented to illuminate the fingers, as shown in FIG. 1. The photo diode array 40 (THORLABS DET110, for example) is arranged to measure the intensity of the $0^{th}$ mode of the reflected diffraction pattern. By analyzing the intensity change of the reflected diffraction mode, the resonance frequencies of both cantilevers can be deduced. The resonator 10 further includes the piezoelectric shaker 50 (THORLABS AE0203D04F, for example) that is attached to the bottom of the base 14 for excitation of the resonator. The oscillation amplitude and frequency of the shaker are controlled by a function generator 52 (TEKTRONIX AFG3102, for example). A lock-in amplifier (Stanford Research Systems SR830) is used to record the signal at the excitation frequency.

Changes in resonance frequency are measured to resolve the loading upon the cantilever, which is expressed by:

$$f = \frac{1}{2\pi}\sqrt{\frac{K}{0.243M + m}} \quad [19],$$ Equation 1 where M is the effective mass of the cantilever,
m is the mass of the load, and
K is the effective stiffness of the cantilever. Accordingly, the difference between the resonance frequencies of the reference and the sensor cantilevers are expressed by the following equation:

$$\Delta f = \frac{1}{2\pi}\left(\sqrt{\frac{K}{0.243M + m_r}} - \sqrt{\frac{K}{0.243M + m}}\right),$$ Equation 2 where $m_r$ is the added load on the reference cantilever, and
m is the added mass on the sensor cantilever. Since the cantilevers are not perfectly rectangular, K and M can be determined by combining finite element simulations with experiments. In one experiment, the effective density of a cantilever beam was taken as 3.65 g/cm³ by averaging a 20 nm thick gold layer with a density of 19.3 g/cm³ and a 480 nm of silicon-rich silicon nitride layer with a density of 3 g/cm³. The Young's modulus was then estimated to be 182.2 GPa by matching the resonance frequency predicted by the finite element simulation with that observed experimentally (6642 Hz). Next, the value for K was determined to be 0.0195 N/m using a finite element simulation by applying a vertical point force at the tip and observing the resulting tip deflection. Finally, M was determined to be 46.08 nano-gram by substituting K into the Equation 1. With the constants of the above equations determined, the only variables are the masses of the target and reference particles, m and $m_r$.

Figure 3:
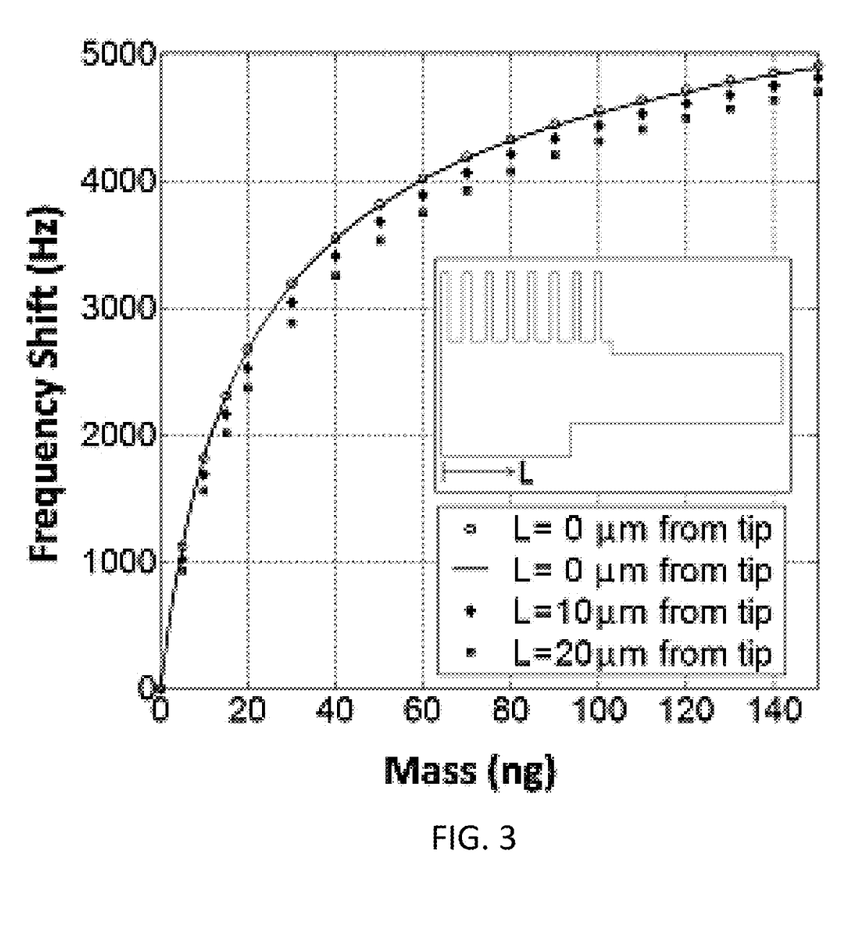
FIG. 3 is a graph of frequency shift as a function of the position of a target particle on a cantilevered arm of the resonator shown in FIG. 1.

For maximum measurement sensitivity the load or target is preferably exactly at the tip of the cantilever. Hence, the micromanipulator here also serves the purpose of placing the target as close to the tip of the cantilever as possible, improving the accuracy of mass measurements. Nevertheless, the effect of loading location on the resonance frequency can be addressed in the weight/mass measurement process. An element analysis can be used to demonstrate the relationship between the resonance frequency and the location of the center of mass of the target entity T positioned on the enlarged surface 18 as depicted in FIG. 3. The variation of the resonance frequency shift with different loading masses and locations on the sensor arm is demonstrated in the graph of FIG. 3. The solid line curve corresponds to an empty reference cantilever 12b and the data points represent the results of the finite element simulation for different target entity positions from the free end or tip of the arm 12a. For improved accuracy in determining the mass, the location of the target entity can be determined using calibrated bright-field microscopy and a corresponding frequency shift vs. mass curve can be generated using finite element analysis.

Figure 4:
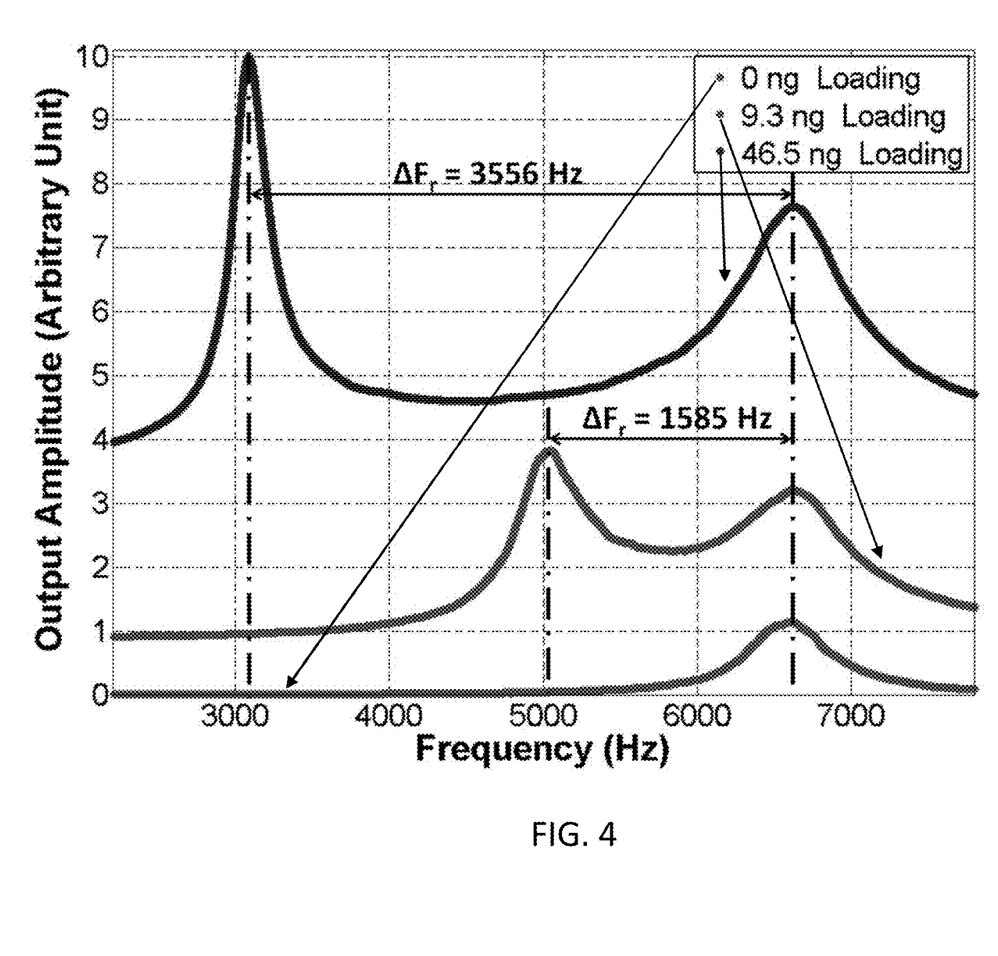
FIG. 4 is a graph of frequency differential between an unloaded reference arm and loaded sensor arms of the resonator and system shown in FIG. 1.

The graph of FIG. 4 shows experimental results of frequency response of the system when one of the cantilevers (the sensor arm 12a) is loaded with three different masses. In each experiment, an individual polystyrene bead (Spherotech) with a different mass was placed on the enlarged surface 18 of the sensor arm 12a for weighing. Prior to the placement, the micromanipulator was used to dip the bottom of the bead in a small amount of grease. It has been found that the grease can efficiently improve the adhesion between the target particles and the cantilever surface but has negligible mass (~70 pico-gram) in comparison with the particles being weighed. Alternatively, the grease can be placed directly on the cantilever surface before placing the target entities, in which case the impact of the grease on the system frequency response can be directly accounted for before the measurements. In FIG. 4, the frequencies corresponding to the two peaks represent the resonance frequencies of the sensor arm 12a (low frequency peak) and the reference arm 12b (high frequency peak). Initially, since both cantilevers are empty, no significant frequency separation occurs and two resonance peaks overlap with each other, as reflected in the lower curve in the graph of FIG. 4. As the load on the sensor arm increases, the resonance peak corresponding to the sensor arm shifts to the left, while the resonance peak of the reference arm remains fixed, so the two resonance frequencies separate. The 9.3 nano-gram bead (middle curve) and the 46.5 nano-gram bead (upper curve) were located 11.6 μm and 12.2 μm away from the tip of the cantilever, respectively. The resonance frequency of the reference arm is unchanged because there is no significant change of mass on the reference arm.

The mass of the load on the sensor arm can be derived readily from the frequency separation between the two peaks with a single measurement. In particular, the frequency shift value can be applied to Equation 2 to solve for the value m corresponding to the mass of the target particle T. In the case where no reference mass is added to the reference cantilevered arm 12b the value for $m_r$ is zero. It is further contemplated that the system can be used to directly determine the differential mass between two particles by loading both cantilevers (instead of leaving the reference arm empty). In this case, the reference arm frequency will also shift to the left in FIG. 4 from the unloaded reference frequency. In Equation 2, the value for $m_r$ will be non-zero, corresponding to the mass of the second particle positioned on the arm 12b. Alternatively, instead of using the Equations 1 and 2, one can prefer to determine the added masses by matching the experimentally observed resonance frequencies with those observed in a finite element simulation of the cantilevered system bearing loads with the same shape and location as determined microscopically, and varying the value of the masses in simulation until the resulting resonance frequency in the simulation matches those observed experimentally.

Figure 5:
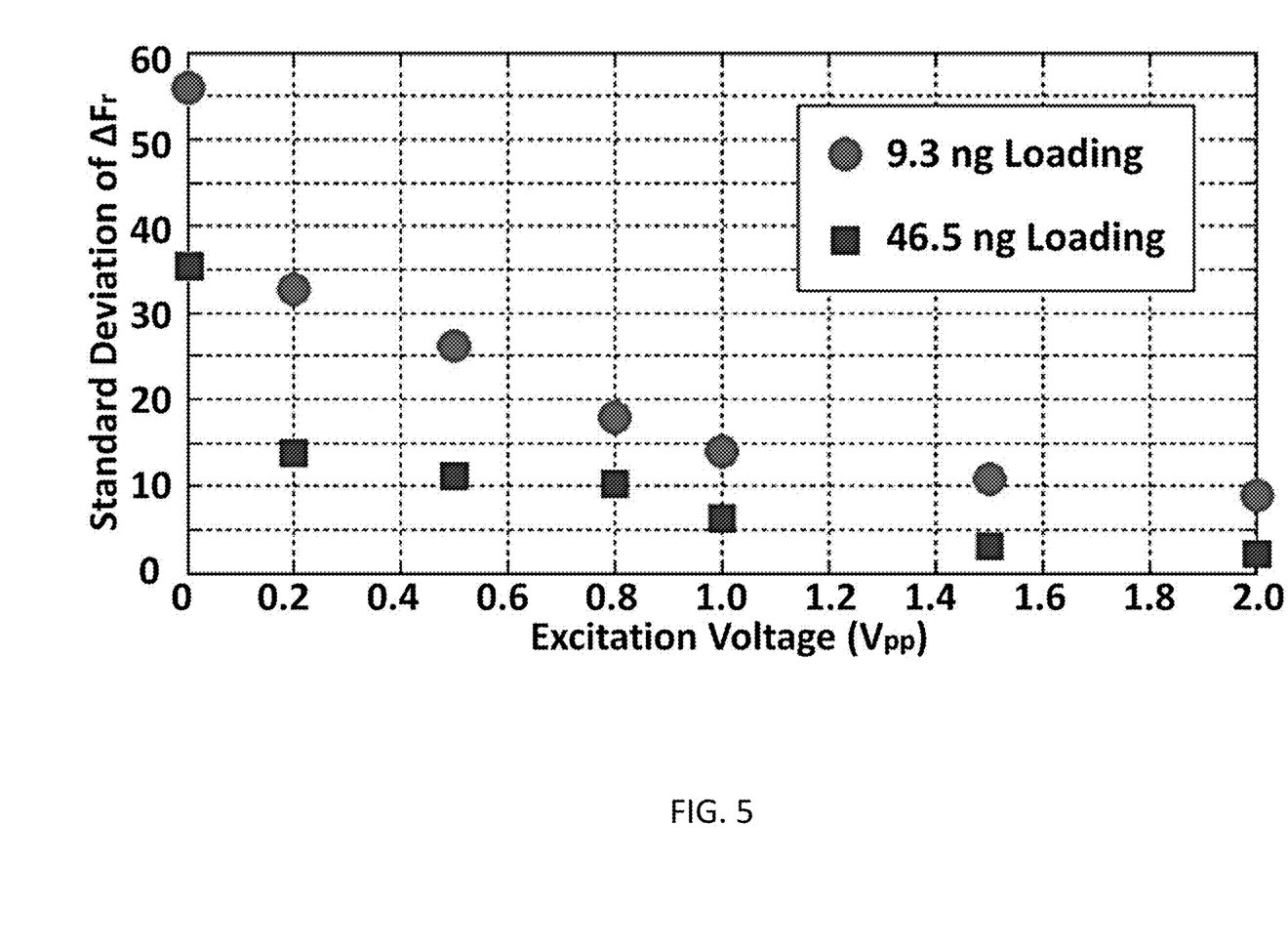
FIG. 5 is a graph showing the standard deviation in measured frequency shift as a function of excitation voltage and loading of the resonator shown in FIG. 1.

The system shown in FIG. 2, and particularly the resonator 10 shown in FIG. 1, provide repeatable resonance frequency measurements, and consequently repeatable weight/mass measurements for micro- and nano-particles. In one verification experiment, the sensing cantilever arm 12a was loaded with an individual polystyrene bead with a known mass and the peak-to-peak excitation voltage to the piezoelectric shaker 50 was varied. Two different beads with different masses (9.3 nano-gram and 46.5 nano-gram) were used and each experiment was repeated five times at each excitation voltage. The standard deviation of the measured resonance frequency was then calculated. The results shown in the graph of FIG. 5 indicate that the repeatability of the measurements improves both with mass loading and with excitation voltage. As reflected in the graph, increasing the load at each excitation voltage resulted in a decrease in standard deviation, with the decrease being more dramatic at the higher voltages. As also shown in the graph, as the excitation voltage is increased the standard deviation decreases for each loading condition, with the standard deviation at the highest voltage being about one-third the standard deviation at the lowest voltage. This reduction in standard deviation is due in part to an increase in mass improving the quality factor of the cantilever, and an increase in external excitation improving the signal-to-noise ratio of the measurement. Hence, in some experiments, in order to reduce the standard deviation of the measured frequency shift, it may be preferable to provide a reference bead of known mass on the reference arm 12b instead of leaving it unloaded. With this modification, the potential error in the resonance frequency can be as low as 1 Hz, which corresponds to about 3 pico-gram with the cantilever mass and stiffness values described above (as calculated using Equation 2).

The effect of other uncertainties on the accuracy of the mass measurement has been investigated. One uncertainty arises from the fabrication of a given wafer forming the resonator 10 may result in wafer dimensions that vary between the two cantilevered arms 12a, 12B. For instance, in one example a change in thickness due to non-uniformity of nitride deposition was measured as 8 nm over a distance of 3 inches on a photolithography wafer, which for a 500 nm-thick film, could alter the stiffness of a cantilever by 4.9% (cubic dependence on thickness) and its mass by 1.6% (linear dependence on thickness). According to Equation 1, the combined effect of this stiffness and mass difference on the natural frequency of a cantilevered arm (with nominal M of 46.08 nano-gram and K of 0.0195 N/m) would be about 106 Hz. However, due to the differential nature of the system as shown in Equation 2, for small loads up to 2 nano-gram, this effect is suppressed to below 1 Hz Even for a 10 nano-gram load, the uncertainty would be only about 11 Hz corresponding to a potential error of about 100 pico-gram).

In another experiment, two cantilevers that were 2 inches apart on a photolithography wafer were found to differ in length by as much as 1 μm (possibly due to alignment errors during photolithography). For a 250 μm long cantilever, the effect of this uncertainty on stiffness can be about 1.2%, and on mass about 0.4%, with the combined effect producing a 53 Hz uncertainty on resonance frequency. However, in a differential system (according to Equation 2) while measuring small loads (<290 pico-gram), uncertainty in length results in no detectable error in resonance frequency shift. For a 10 nano-gram load, the uncertainty would be 19 Hz (about 200 pico-gram). In practice however, these errors can be mitigated by measuring the dimensions of the particular cantilevers with high accuracy using scanning electron microscopy (SEM) and determining the related M and K before the measurement. For example, a 2 nm uncertainty in measuring thickness in SEM would result in no detectable errors in measuring loads up to 4.7 nano-gram, a 24 pico-gram error in measuring a 10 nano-gram load and a 1.5 nano-gram error in measuring a 100 nano-gram load. A 2 nm uncertainty in 250 μm nominal length would result in no detectable error in resonance frequency. Note that the above uncertainty analyses assumed that the reference cantilever is empty. Hence for a differential system, loading the reference cantilever with a mass similar to that on the sensing cantilever can further mitigate the effects of uncertainties. Another experiment evaluated the frequency uncertainty as a function of the location of the target particle or load on the cantilevered arms. An analysis similar to that shown in the graph of FIG. 3 suggests that a 200 nm uncertainty in assessing the location of the load (the limit of a typical brightfield microscope) would result in a 23 pico-gram uncertainty in the measured mass of a 10 nano-gram particle. This uncertainty is less than 3 pico-gram while measuring particles that weigh 1 nano-gram or less. For many applications, this uncertainty can be further mitigated by measuring the location of the target particle or load using SEM.

Weighing of Individual Stem Cell Spheres

Figure 6:
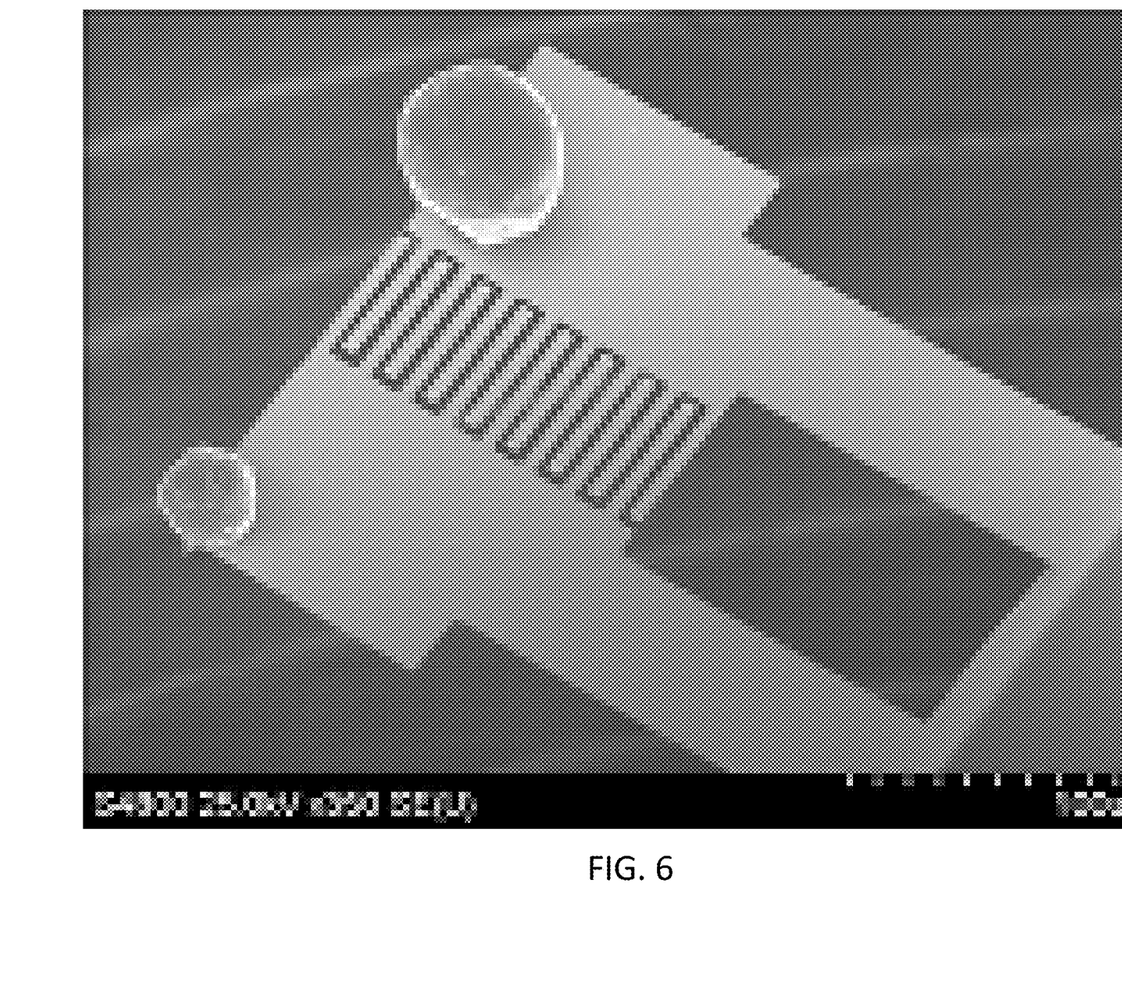
FIG. 6 is a scanning electron micrograph (SEM) of two stem cell spheres mounted on the cantilevered beams of the resonator as shown in FIG. 1.
Figure 7:
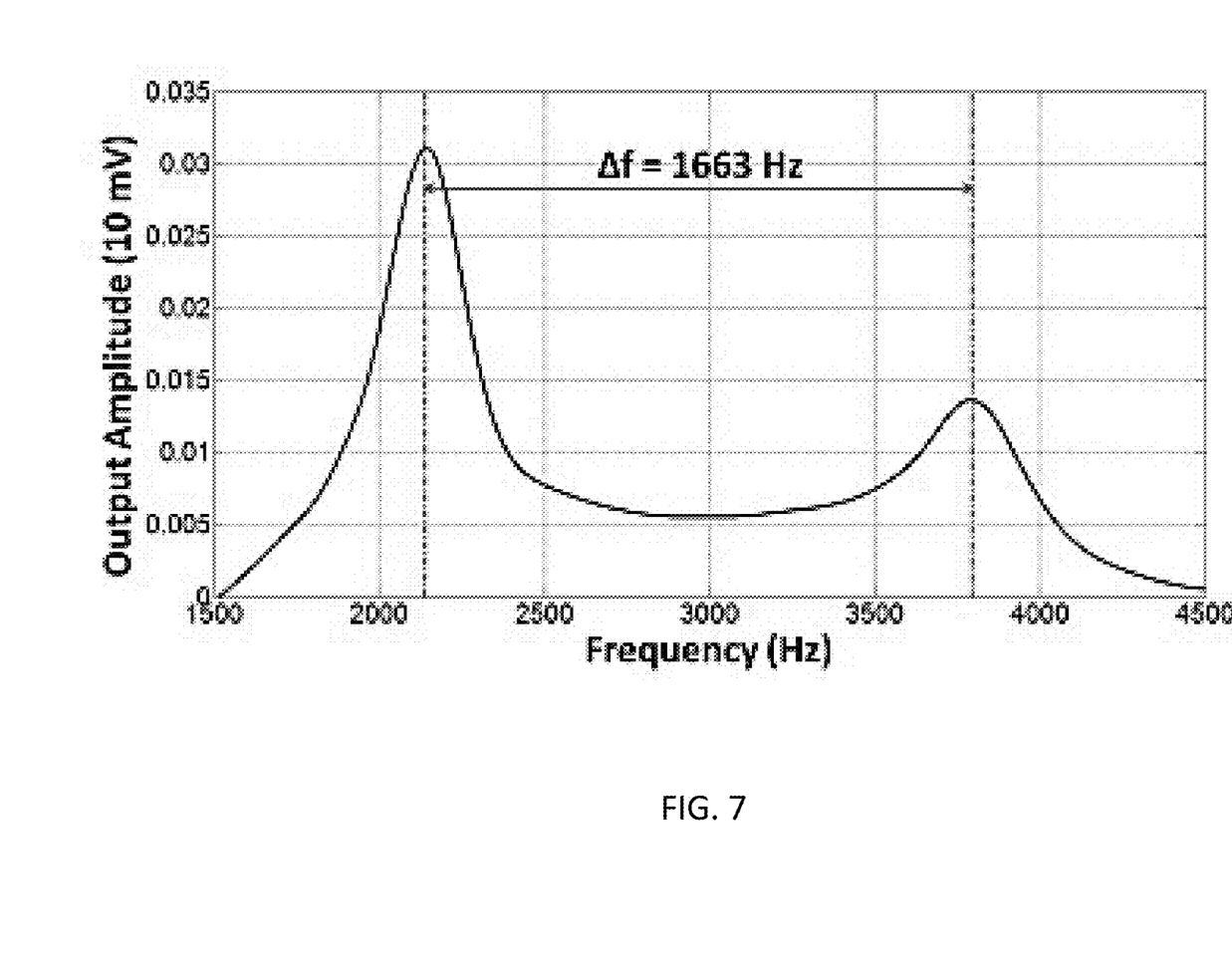
FIG. 7 is a graph of the frequency spectrum showing the comparative weighing of the two stem cell spheres depicted in FIG. 6.

In one procedure, the system was used to weigh individual stem cell spheres. Currently, stem cells are of interest because of their capacity for organ replenishment and for their potential role in cancer initiation and progression. Stem cells form multiple spheres in soft agar. These spheres are usually not analyzed individually but en masse. With the system disclosed herein an individual stem cell sphere can be extracted from culture medium and weighed. One experiment was conducted with adolescent male murine prostate stem cell spheres that were cultured for 10 days. The cell spheres were fixed by formalin, followed by dehydration using ethanol. Then, the stem cell spheres were left to dry on a glass surface for subsequent testing steps. FIG. 6 illustrates the SEM image of two stem cell spheres placed on different cantilevers for weighing. One of the cantilevers was loaded with a larger stem cell sphere located 14.2 μm away from the cantilever tip, while the smaller sphere was located 9.8 μm away from the cantilever tip. The frequency response of the loaded resonator, as shown in FIG. 7, show a left peak and the right peak of the frequency spectrum illustrate the resonance frequencies corresponding to the cantilevers loaded with larger and smaller spheres, respectively. The difference in the masses of both cell spheres is derived from the differential frequency of 1663 Hz as 88.2 nano-gram with the mass of the big cell sphere being 114 nano-gram and small sphere being 25.8 nano-gram. The ability to easily compare two individual stem cell spheres in terms of mass could offer interesting possibilities in understanding their biology and their response to various treatments.

Humidity Response of *Bacillus Subtilis* Spores

Figure 8:
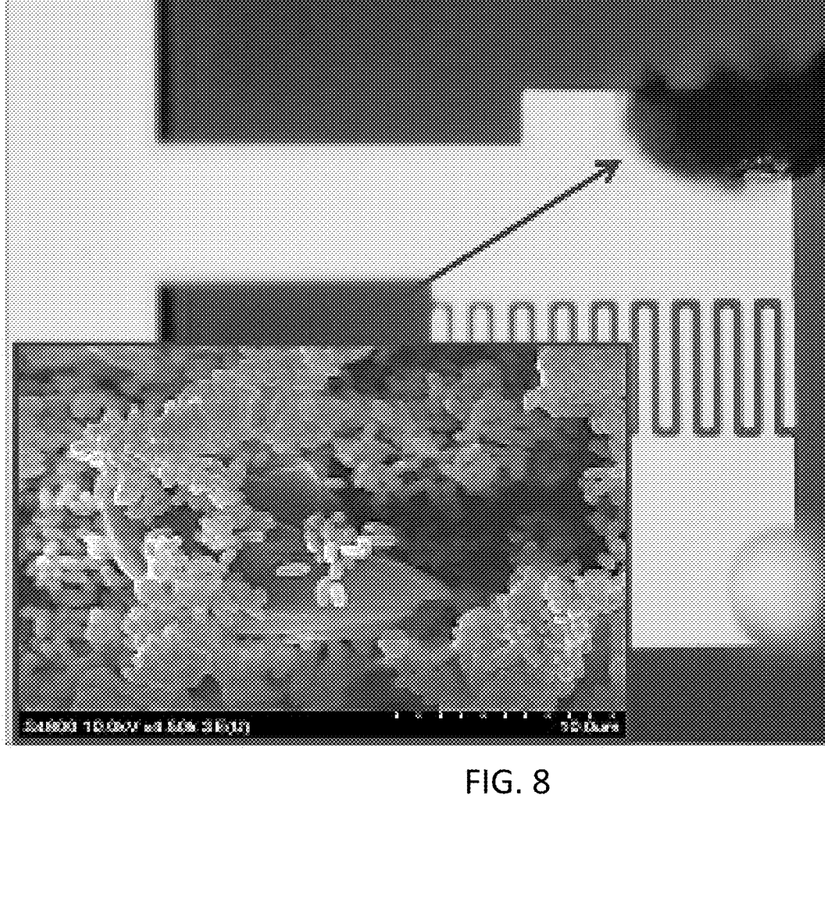
FIG. 8 is a micrograph of the resonator of FIG. 1 shown with a spore cluster mounted on the sensor beam and a reference bead mounted on the reference beam, together with an inset view showing an SEM image of the spore cluster.

In another procedure the system was used to assess the response of *Bacillus subtilis* spores to environmental stimuli. These spores can absorb water, and dehydrate when heated. By weighing the spores at different humidity levels, the amount of water absorbed by the spores can be measured. The experiment started by collecting spore clusters using a micromanipulator. After the spores were dried out on a glass surface, the micromanipulator was employed to tenderly pile up the spores. The multilayered coat structure of each spore renders it as one of the most durable cell types so that the spores remain intact after being grouped. After collecting sufficient spores, the cluster of spores was picked up and placed on the tip of the cantilever arm, which had been pre-paved with a thin layer of grease to prevent the spore cluster from flying away. This particular cantilever pair is slightly different from the one used in the previously described experiment hence the effective stiffness and the effective mass were determined again as 0.0187 N/m and 45.6 nano-gram, respectively. As seen in photomicrograph of FIG. 8, the sensor arm 12a of the cantilever resonator was loaded with a cluster of *B. subtilis* spores, and the reference arm 12*b* was loaded with a reference bead. The experiment took place in a closed space to facilitate humidity control.

Figure 9:
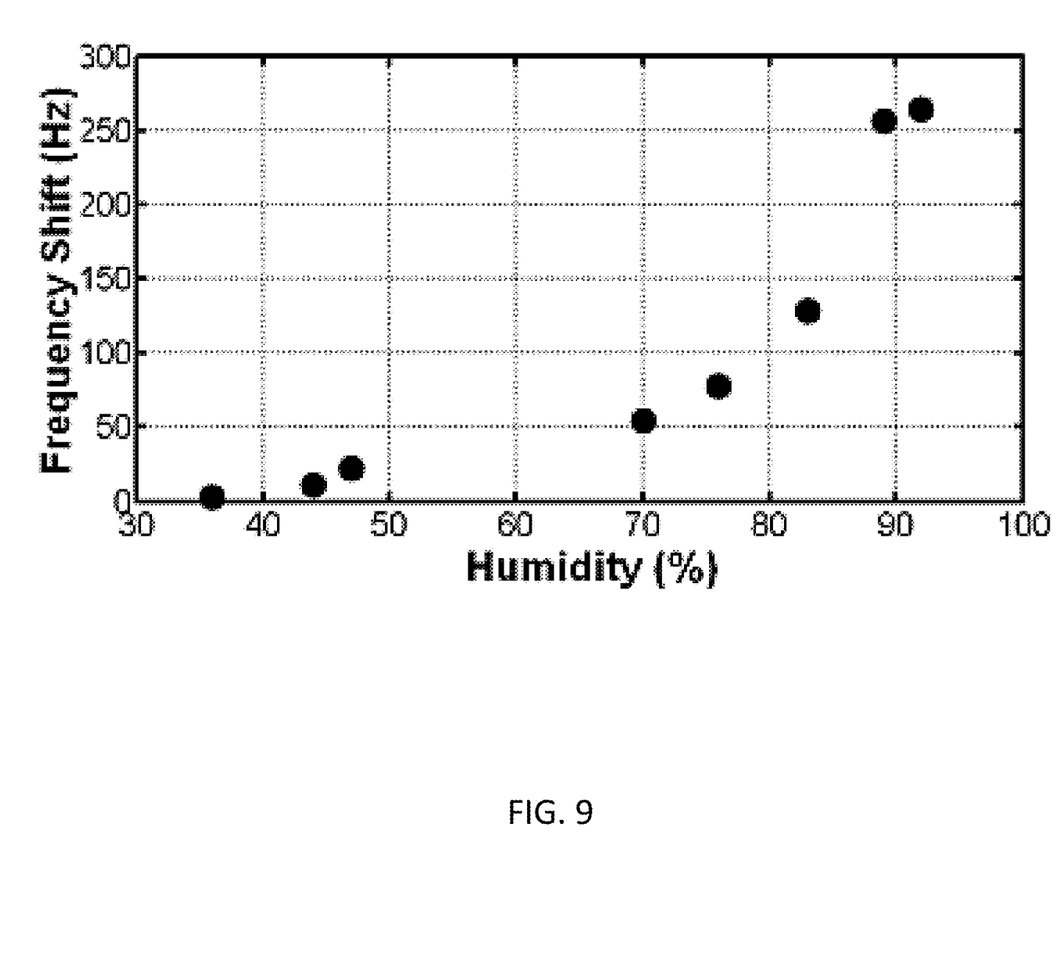
FIG. 9 is a graph of the change in differential frequency with increasing humidity for the experimental set-up shown in FIG. 8.
Figure 10:
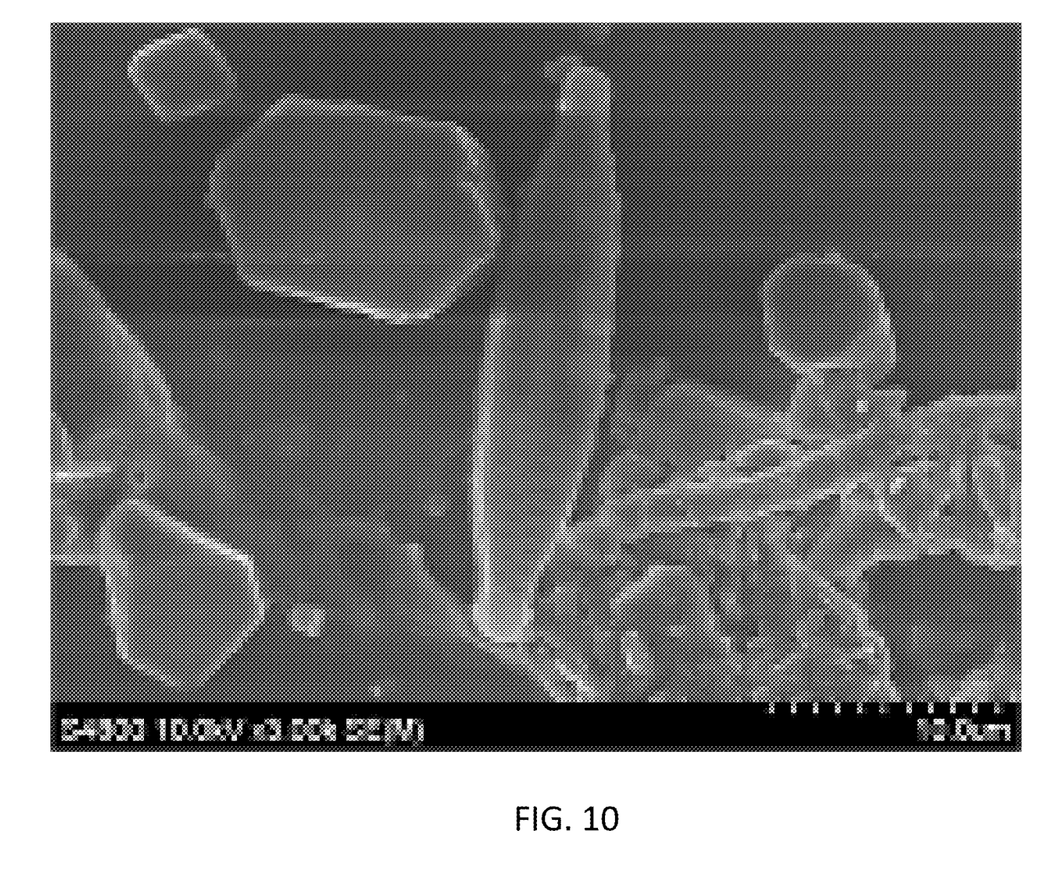
FIG. 10 is an SEM image of the contents of a dried pond water sample.
Figure 11:
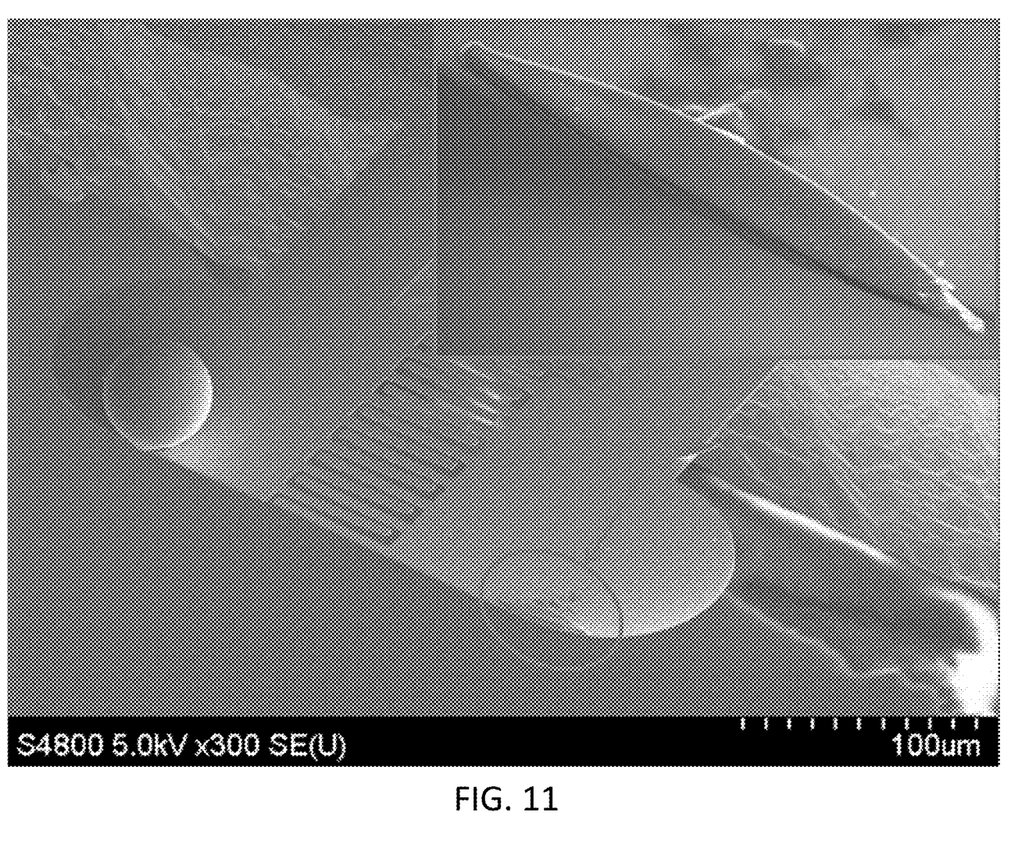
FIG. 11 is an SEM image of a diatom obtained from the sample shown in FIG. 10, with the diatom mounted on the sensor beam of a resonator as shown in FIG. 1, with an inset of the diatom on the end of the beam.

The resulting relationship between humidity change and mass is shown in the graph of FIG. 9. The initial frequency shift value is deliberately set to 0 for clarity. The initial mass of the spore cluster was 18.8 nano-gram, which varied with relative humidity. The mass increased from 18.8 nano-gram to 23.2 nano-gram as the relative humidity increased from 36% to 92%. The 23.5% increase in the spore mass is in accordance with a previous study. The effect of humidity on the cantilevers themselves is suppressed by the inherently differential detection. Consequently, only the water adsorbed in the spores is measured.

Weighing of Diatoms from Pond Water

In a further example of the versatility of the system and resonator disclosed herein, the system was used to weigh individual diatom algae. Diatoms are unicellular algae that are widely observed in aquatic environments. They have been extensively studied in various fields including ecology, bioengineering, medicine, and nanotechnology. Due to their special features (such as amorphous silica skeletons, uniform nano-porous structures, chemical inertness, and versatile forms and sizes) researchers have proposed multiple applications of diatoms such as in biophotonics, microfluidics, nanofabrication, gel filtration, and drug delivery, The ability of the system disclosed herein to individually pick and weigh single diatoms could provide new insight into their characterization and their use as biotechnological tools. To measure the mass of diatom particles, a cantilever arm with circular head shape was used to weigh single diatom cells, as shown in the photo micrograph of FIG. 11. The effective stiffness of this particular cantilever pair was 0.0188 N/m and the effective mass was calculated as 54.2 nano-gram. In the experiment, a drop of outdoor pond water that contained large amounts of diverse microorganisms including bacteria, algae, and protozoa, was first left to dry in air on a glass slide.

FIG. 10 shows a spot on the glass slide with numerous micro-particles, a pennate-type diatom and other microorganisms. A single diatom was extracted using a micromanipulator and place it at the tip of the sensor cantilever for weighing as shown in FIG. 11. A polystyrene bead with known mass was placed on the reference cantilever arm to improve the resolution of the measurement, as discussed above. The diatom and the reference bead were placed 2.8 μm and 17.4 μm away from the suspending end of the cantilever, respectively. As a result, the differential resonance frequency between two adjacent cantilevers was measured as 2173 Hz, and the differential mass between the two particles was measured as 42.2 nano-gram with the mass of the diatom being 4.4 nano-gram.

In one aspect of the present disclosure, the resonator includes a pair of arms cantilevered from a base, in which the base is configured for engagement with an oscillator or shaker to induce oscillation of the arms. Each arm defines a surface configured to receive a micro- or nano-sized particle or object. The arms further define interdigitating fingers between each other that are adapted to define a diffraction pattern from incident light reflected from the fingers as the cantilevered arms oscillate. In one method of using the system, a target particle is mounted on a sensor arm, while the other arm, or the reference arm, may be unloaded or loaded with a particle having a known mass. The base of the resonator is oscillated to cause vibration of the cantilevered sensor and reference arms at their respective resonant frequencies. The resonance frequencies of both arms are obtained by sensing the intensity of a diffraction mode produced by the interdigitated fingers. This approach prevents the user from having to perform two different experiments (one for each cantilever) and allows obtaining the two resonance frequencies in one experiment. Hence, the differential frequency, or difference between the detected resonant frequencies of the two arms, is also obtained by the same way. The differential frequency value can be used in an equation to solve for the mass of the target particle on the sensor arm. Alternatively, the resonance frequencies observed experimentally can be used in a finite element simulation to determine the mass of the loaded particles.

With this versatile method it is possible to isolate fragments of cells, individual cells, or individual groups of cells such as prostate stem cell spheres, from culture and measure their weight. The same system can be used to aggregate and measure the humidity response of cells, such as spore cells, while minimizing the effect of the humidity on the sensor itself due to the inherently differential nature of the measurement. The system and resonator disclosed herein provides capability of extracting and weighing an individual particle, such as a diatom from a cluster of micro-particles found in outdoors pond water.

Those skilled in the art will recognize that numerous modifications can be made to the specific implementations described above. The implementations should not be limited to the particular limitations described. Other implementations may be possible.

The invention claimed is:

1. A device for weighing micro- and nano-sized particles, comprising:

a base portion;

an oscillator coupled to the base portion configured to vibrate the base portion;

a first cantilevered beam coupled to the base portion at a proximal end and having a tip portion at a distal end;

a second cantilevered beam coupled to the base portion at a proximal end and having a tip portion at a distal end;

each of the first and second cantilever beams further having a first plurality of fingers near the first tip portion inwardly pointing and a second plurality of fingers near the second tip portion inwardly pointing, respectively, such that the entirety of each cantilever beam is positioned in a side-by-side manner next to the entirety of the other;

the first plurality of fingers interdigitating with the second plurality of fingers such that the first cantilevered beam and the second cantilevered beam can oscillate independent of each other, and where the interdigitating fingers separated by gaps that are configured to reflect light from the interdigitating fingers during oscillation of the first and second cantilevered beams to form a diffraction pattern.

2. The device of claim 1, the tip of the first cantilevered beam includes a first retaining feature configured to maintain position of a particle placed thereon for weighing.

3. The device of claim 2, the tip of the second cantilevered beam includes a second retaining feature configured to maintain position of a reference weight placed thereon for weighing the particle.

4. The device of claim 1, the first and second cantilevered beams are silicon-based.

5. The device of claim 1, each cantilevered beam has a length of between about 50 μm to 500 μm and a width outside of the tip portion of each of the first and second cantilever beams of between about 10 μm to 100 μm.

6. The device of claim 5, the tip portion of each of the first and second cantilever beams has a width of between about 10 μm to 100 μm.

7. The device of claim 6, each of the fingers has a width of between about 2 to 5 μm and a length of between about 10 μm to 100 μm and the gap is between about 1 μm to 5 μm.

8. A system for weighting micro- and nano sized particles, comprising:
- a resonator, the resonator comprising:
  - a base portion,
  - an oscillator configured to provide mechanical vibration according to a selective sweep of frequencies to the base portion;
  - a first cantilevered beam coupled to the base portion at a proximal end and having a tip portion at a distal end,
  - a second cantilevered beam coupled to the base portion at a proximal end and having a tip portion at a distal end,
  - each of the first and second cantilever beams further having a first plurality of fingers near the first tip portion inwardly pointing and a second plurality of fingers near the second tip portion inwardly pointing, respectively, such that the entirety of each cantilever beam is positioned in a side-by-side manner next to the entirety of the other, and
  - where the interdigitating fingers separated by gaps that are configured to reflect light from the interdigitating fingers during oscillation of the first and second cantilevered beams to form a diffraction pattern;
- a light source positioned proximate to the resonator and configured to shine light on the interdigitating fingers; and
- at least one optical detector positioned proximate to the resonator to measure light intensity of at least one of the modes of the diffraction pattern.

9. The system of claim 8, the at least one mode is the $0^{th}$ mode.

10. The system of claim 8, the light source is a laser.

11. The system of claim 8, the tip of the first cantilevered beam includes a first retaining feature configured to maintain position of a particle placed thereon for weighing.

12. The system of claim 11, the tip of the second cantilevered beam includes a second retaining feature configured to maintain position of a reference weight placed thereon for weighing the particle.

13. The system of claim 8, the first and second cantilevered beams are silicon-based.

14. The device of claim 1, wherein the first and second cantilever beams are configured to provide a relative weight difference measurement generating a measurement of differences of mass between two weights each placed on a corresponding cantilever beam.

15. The system of claim 8, wherein the first and second cantilever beams are configured to provide a relative weight difference measurement generating a measurement of differences of mass between two weights each placed on a corresponding cantilever beam.

16. A device for weighing micro- and nano-sized particles, comprising:
- a base portion;
- an oscillator coupled to the base portion configured to vibrate the base portion;
- a first cantilevered beam coupled to the base portion at a proximal end and having a tip portion at a distal end;
- a second cantilevered beam coupled to the base portion at a proximal end and having a tip portion at a distal end;
- each of the first and second cantilever beams further having a first plurality of fingers near the first tip portion inwardly pointing and a second plurality of fingers near the second tip portion inwardly pointing, such that the entirety of each cantilever beam is sized and shaped substantially the same as the other and whereby the first and second cantilever beams positioned to allow the first plurality of fingers interdigitating with the second plurality of fingers such that the first cantilevered beam and the second cantilevered beam can oscillate independent of each other, and
- where the interdigitating fingers separated by gaps that are configured to reflect light from the interdigitating fingers during oscillation of the first and second cantilevered beams to form a diffraction pattern, wherein the first and second cantilever beams are configured to provide a relative weight difference measurement generating a measurement of differences of mass between two weights each placed on a corresponding cantilever beam.

17. The device of claim 16, the tip of the first cantilevered beam includes a first retaining feature configured to maintain position of a particle placed thereon for weighing.

18. The device of claim 17, the tip of the second cantilevered beam includes a second retaining feature configured to maintain position of a reference weight placed thereon for weighing the particle.

19. The device of claim 16, the first and second cantilevered beams are silicon-based.

* * * * *